United States Patent [19]

Wenger et al.

[11] 4,356,836

[45] Nov. 2, 1982

[54] TUBELESS TIRE VALVE STEM AND COVER

[76] Inventors: Clayton P. Wenger, 4541 SE. 27th St.; Clifford A. Reeves, 3925 SE. 32nd St. Pl., both of Topeka, Kans. 66605

[21] Appl. No.: 175,028

[22] Filed: Aug. 4, 1980

[51] Int. Cl.³ ............................................. F16K 19/20
[52] U.S. Cl. .................................... 137/232; 137/377; 138/89.3; 138/89.4; 152/428; 152/DIG. 13
[58] Field of Search ................. 152/428, 431, DIG. 7, 152/DIG. 11, DIG. 13; 137/232, 382, 378, 379, 377; 138/89.1–89.4

[56] References Cited

U.S. PATENT DOCUMENTS

| | | | |
|---|---|---|---|
| 1,326,455 | 12/1919 | Kautzman | 138/89.4 |
| 1,493,294 | 5/1924 | Timberlake | 294/143 X |
| 1,498,294 | 6/1924 | Preston | 137/232 |
| 1,631,050 | 5/1927 | Murphy | 138/89.2 |
| 1,792,659 | 2/1931 | Schweinert | 138/89.2 |
| 2,475,451 | 7/1949 | Gouirand | 152/DIG. 13 |
| 3,712,326 | 1/1973 | Thacker | 152/427 X |
| 3,794,098 | 2/1974 | Versen | 152/428 |

FOREIGN PATENT DOCUMENTS 1530762 11/1978 United Kingdom ............... 137/232

OTHER PUBLICATIONS

Zimmerman et al., "Handbook of Material Trade Names", Supplement III, Dover, N.H., Industrial Research Service, Inc., p. 65, 1953, c. 4.

Primary Examiner—Edward C. Kimlin
Assistant Examiner—Thomas Bokan
Attorney, Agent, or Firm—Edward L. Brown, Jr.

[57] ABSTRACT

A rigid valve stem cover for flexible tubeless tire type valve stems. The cover has a frustro conical shape which threadably engages the valve stem at its upper end while the bottom edge of the cover comes in contact with the stem and wheel rim area surrounding the stem and provides substantial rigidity to the stem.

2 Claims, 3 Drawing Figures

TUBELESS TIRE VALVE STEM AND COVER

BACKGROUND OF THE INVENTION

In the early history of pneumatic automobile tires there have been numerous designs for valve stem covers, as illustrated in the following U.S. patents:

U.S. Pat. No. 1,792,659 to Schweinert
U.S. Pat. No. 1,631,050 to Murphy
U.S. Pat. No. 1,498,294 to Preston
U.S. Pat. No. 1,326,455 to Kautzman.

All of these prior art valve stem covers involved rigid metal stems utilized with an inner-tube type tire. With the recent advent of tubeless tires, a rubber valve stem has evolved which carries a conventional air valve in its threaded outer end. These rubber stems are vulnerable to various sharp objects which they may come into contact with. While these valve stems do have small caps which merely protect the interior valve and its threaded end, the basic rubber stem has been left exposed to the elements along with other road hazards. A rubber valve stem of this type requires a substantial amount of resiliency so that it may seal in the rim opening as the stem is pulled into place. An exposed rubber valve stem becomes stiff and deteriorates due not only to the exposure to the sun but also contact with various salts, oils and other road-related substances.

DESCRIPTION OF THE PRESENT INVENTION

The present invention not only protects the air valve from dust and moisture, but also extends completely over the rubber stem sealing it from the outside elements. The valve cover when snugly threaded onto the valve stem also provides a degree of rigidity to a normally flexible stem which is quite vulnerable to any sharp object which it might come in contact with. The modern wheel covers, which have replaced the conventional hub cap, extend substantially out to the periphery of the wheel rim which requires that the valve stem must pass through an opening in the wheel cover itself. The edge of these wheel cover openings have themselves been a factor in the damage to valve stems.

It is therefore the principal object of the present invention to provide a new and improved tubeless tire valve stem cover.

Another object of the present invention is to provide a valve stem cover which gives rigidity and shearing strength to an otherwise flexible stem.

Another object of the present invention is to provide a valve stem cover which seals the entire stem against the elements.

These and other objects of the invention will become more readily apparent upon further description with reference to the accompanying drawings.

DESCRIPTION OF THE PREFERRED EMBODIMENT

Figures 1, 2:
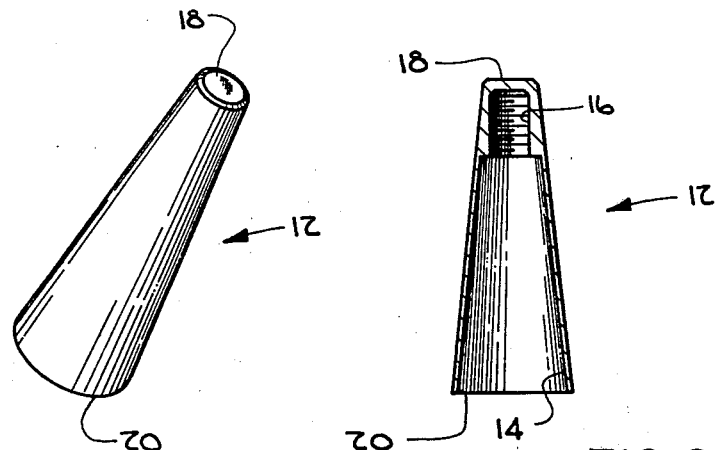
FIG. 1 is a perspective view of the valve stem cover.
FIG. 2 is a longitudinal sectional view of the cover.

The valve stem cover of the present invention is generally described by reference numeral 12, as seen in FIGS. 1 and 2. The cover 12 is tapered along its length having a frustro conical shape with an open bottom 20 and a closed top 18. Located at the upper end of the cover 12 is a threaded opening 16 which threadably engages the end of a conventional tubeless tire valve stem 40, as seen in FIG. 3.

Figure 3:
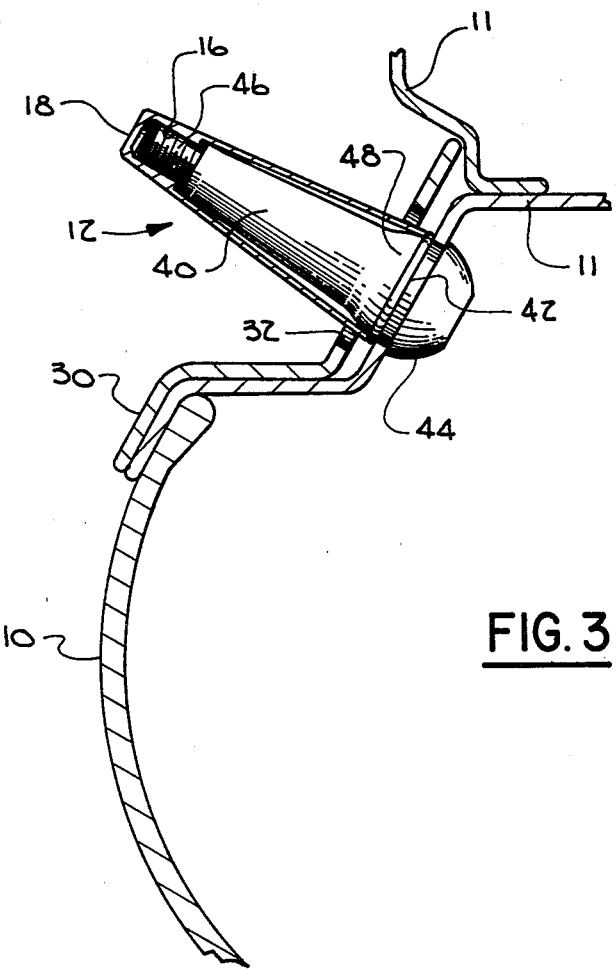
FIG. 3 is a sectional view of a standard tubeless tire with the valve cover in place on the valve stem.

With a conventional tubeless tire 10, as seen in FIG. 3, the rim 11 must be air-tight in the absence of an inner tube. Rubber valve stem 40, when positioned in rim 11, must provide an air-tight seal around the stem opening in the rim 11. The lower end of valve stem 40 includes an enlarged portion 44 which is traversed by a circumferential groove 42. To insert a valve stem 40 in place, the threaded end 46 of the stem is inserted from the backside of the rim through the stem opening and pulled outward until the ridged area 48 of the stem comes through the rim opening. In this position, the rim is located in the valve stem groove 42 and creates an air-tight seal. Removably located on wheel rim 11 is a wheel cover 30 which includes an opening 32 therein for passage of the valve stem 40.

Valve cover 12 is threaded onto the threaded end 46 of valve stem 40. The lower end 20 of the valve stem cover comes in contact with the ridged area 48 of the valve stem which is also in the immediate area of the valve stem opening in rim 11. Due to the slight degree of curvature in rim 11, the ridged area 48 of the stem, which is pinched between the edge 20 and the rim, provides a seal even though the surface of rim 11 adjacent the valve stem opening is not totally flat. With the valve cover 12 in place, the rubber area of the valve stem 40 is completely covered except for that small line of area 48 which is exposed. The cover 12 not only protects the rubber portion of the stem from various caustic substances such as salt, or other chemicals, but also sunlight.

As the cover 12 is tightened onto valve stem 40, there is a stretching effect applied to stem 40 with the lower edge 20 of the cover firmly seating against the rim and the ridged area 48 of the stem. In this tightened position, the cover 12 and stem 40 act together giving more rigidity to the valve stem 40.

While FIG. 3 illustrates only one particular shaped valve stem cover 12, there are various other valve stem covers which can be made to fit all of the standard rubber valve stems on the market. Some of the stems are shorter in length while others have a narrower bottom dimension. These other cover shapes would only differ in proportions, while their function would remain identical to the one illustrated in FIG. 3.

The valve covers can be manufactured from a variety of materials and methods including metals and ceramics. A preferred method would be to mold the cover from a thermo-plastic material such as plateable grade ABS (Acrylonitrile Butadiene Styrene), or the resin Delrin, which is a federally registered trademark of the E. I. DuPont Company. If molded from plateable ABS, the cover would then be metal plated with a chrome finish. If molded from Delrin, the resin can be tinted with color, to correspond with the various styles of wheel rims currently on the market.

Having described the invention with sufficient clarity to enable those familiar with the art to construct and use it, we claim:

1. A tubeless tire valve stem and cover including:
   a rubber valve stem with a threaded metal outer end, the inner end of the stem having an enlarged portion with a circumferential groove therein for sealing against the opening in the wheel rim;

the improvement comprising a rigid valve stem cover having a frustro conical shape with an open bottom edge and a closed top;

thread means inside the cover, located at the top thereof for receipt of the threaded end of the valve stem, the cover having a height dimensioned so that as the thread means engage the threads of the stem, the bottom edge of the cover is forced against the enlarged portion of the stem in sealing engagement with the stem thereby providing rigidity to the stem.

2. A valve stem and cover as set forth in claim 1, wherein the inside diameter of the bottom of the cover is dimensioned to seal the cover against the enlarged portion of the valve stem.

* * * * *